United States Patent
Fiala

[11] Patent Number: 5,982,543
[45] Date of Patent: Nov. 9, 1999

[54] ZONED LENS

[75] Inventor: Werner Fiala, Vienna, Austria

[73] Assignee: Bifocon Optics Forschungs-Und Entwicklungsgmbh, Vienna, Austria

[21] Appl. No.: 08/714,087

[22] PCT Filed: Mar. 17, 1995

[86] PCT No.: PCT/AT95/00051

§ 371 Date: Dec. 13, 1996

§ 102(e) Date: Dec. 13, 1996

[87] PCT Pub. No.: WO95/25288

PCT Pub. Date: Sep. 21, 1995

[30] Foreign Application Priority Data

Mar. 17, 1994 [AU] Australia ............... A 569/94

[51] Int. Cl.$^6$ ............ G02B 27/44; G02B 5/18; G02B 3/08; G02C 7/02
[52] U.S. Cl. ............ 359/565; 359/566; 359/571; 359/742; 351/159
[58] Field of Search ............ 359/565, 566, 359/571, 569, 742, 558; 351/159, 160 R

[56] References Cited

U.S. PATENT DOCUMENTS

| | | |
|---|---|---|
| 4,775,229 | 10/1988 | Ichihara et al. . |
| 4,787,722 | 11/1988 | Claytor .................... 350/452 |
| 4,804,249 | 2/1989 | Reynolds et al. .......... 350/437 |
| 4,995,714 | 2/1991 | Cohen . |
| 5,056,908 | 10/1991 | Cohen . |
| 5,116,111 | 5/1992 | Simpson et al. .......... 389/565 |
| 5,229,797 | 7/1993 | Futhey et al. . |
| 5,719,704 | 2/1998 | Shiraishi et al. .......... 359/558 |

FOREIGN PATENT DOCUMENTS

| | | |
|---|---|---|
| 1318799 | 8/1993 | Canada . |
| 0 367 878 A1 | 5/1990 | European Pat. Off. . |
| 0 375 152 A2 | 6/1990 | European Pat. Off. . |
| 4130092 A1 | 3/1991 | Germany . |
| 57-161721 | 5/1982 | Japan . |
| 62-085229 | 4/1987 | Japan . |

OTHER PUBLICATIONS

*Encyclopaedic Dictionary of Physics*, Pergamon Press, 1961, pp. 266–267.

H. Haumann/G. Schröder, *Bauelemente der Optik*, Carl Hanser Verlag, pp. 150–151.

*Meyers Lexikon der Technik und der exakten Naturwissenschaften*, Bibliographisches Institut, p. 1041.

*Primary Examiner*—Jon W. Henry
*Assistant Examiner*—Audrey Chang
*Attorney, Agent, or Firm*—Hoffman & Baron, LLP

[57] ABSTRACT

A zoned lens comprises at least two adjacent zones (16) formed such that the differences between the optical path lengths between an object point and a pixel of light beams extending through these two adjacent zones (16) of the lens (15) are at least equal to half the coherence length of the light used, preferably at least equal to the coherence length of the light used.

39 Claims, 13 Drawing Sheets

ZONED LENS

FIELD OF THE INVENTION

The invention relates to a zoned lens.

BACKGROUND OF THE INVENTION

Lenses are in this case generally understood to be both refractive lenses and diffractive lenses (for example, Fresnel zone plates). A diaphragm provided with a small hole can also be provided with effective powers (effective refractive powers), as described with reference to the drawings. Optical elements with a zero nominal power but with a limited aperture such as, for example, circular or annular plates with parallel front and rear surfaces can therefore also be understood here as "lenses".

Different zones of a lens are represented by areas of a lens which can be differentiated by physical properties, wherein between the zones the physical properties alter very rapidly or abruptly over a relatively small area. In particular, step-like sudden changes in the thickness of the lens material being used, for example, steps on the front or rear surface of the lens, delimit different zones of a lens. The use of different lens materials in different areas of the lens also results in a zoned lens in the present sense. The geometrical arrangement of the different zones can be configured in many different ways. For example, a central circular zone can be provided, to which outer concentric annular zones are adjacent. The surface areas of the different zones can be the same or different.

SUMMARY OF THE INVENTION

The object of the invention is to provide a zoned lens with novel optical properties. This is achieved according to the invention in that it comprises at least two adjacent zones, wherein the differences in the optical path lengths between an object point and an image point, of light rays passing through these two adjacent zones of the lens, are at least equal to half the coherence length of the light used, preferably at least equal to the coherence length of the light used. If there are optical materials with different refractive indices in the different zones, in such a configuration it can advantageously be provided that any two rays parallel to the axis through two adjacent zones pass through optical path lengths within the lens which differ by at least the coherence length. If adjacent zones are made from the same lens material, the optical path lengths of any two rays parallel to the axis through the two adjacent zones have to differ by at least $CL \cdot n_c/(n_c-n_i)$, wherein CL is the coherence length of the light used, $n_c$ is the refractive index of the lens material and $n_i$ is the refractive index of the medium surrounding the lens. The values $n_c=1.5$ and $n_i=1$ produce, for example, 3 CL. This condition is satisfied when, for example, steps of a height resulting from $CL/(n_c-n_i)$ are provided between the zones. The values selected for $n_c$ and $n_i$ and the coherence length of, for example, 2 micrometers, produces a step height of 4 micrometers.

In the case where the differences in the optical path lengths of the light rays which pass through adjacent zones of the lens between an object point and an image point are at least equal to the coherence length of the light used, there is no interference of the light rays passing through the adjacent zones, as will be described in more detail with reference to the drawings, whereby in various applications advantages can be obtained compared to conventional lenses. For example, in bifocal lenses disturbing interferences between the areas with different focal lengths can be eliminated.

If the steps are configured so that the optical path length differences of the light rays through adjacent zones between an object point and an image point are shorter than the coherence length but at least equal to half the coherence length of the light used, the interference of the light rays passing through adjacent zones is reduced but not completely suppressed, which may be sufficient for some applications. Zoned lenses with such reduced steps are thus also the subject-matter of the invention.

In an embodiment of the invention it is provided that adjacent zones of the lens have a different thickness, wherein steps are provided between the zones. The step height between adjacent zones of the lens has to be at least $|\lambda^2/(\Delta\lambda(n_c-n_i))|$, wherein $\lambda$ is the average wavelength of the light used, $\Delta\lambda$ is the half-value width of the wavelength distribution of the light used, $n_c$ is the refractive index of the lens material, and $n_i$ is the refractive index of the medium adjacent to the lens. The coherence length is given by $CL=\lambda^2/\Delta\lambda$. When visible light with a coherence length in the region of approximately 1–10 μm is used, the step height, measured in micrometers, between adjacent zones of the lens has to be at least $5/|(n_c-n_i)|$, wherein $n_c$ is the refractive index of the lens material and $n_i$ is the refractive index of the medium adjacent to the lens. Advantageously, a step height of at least 3 micrometers, preferably of at least 10 micrometers, is provided. As the standard lens materials have a refractive index of approximately 1.5, and as the light reemitted from subjects illuminated with "white" light has coherence lengths which are normally in the region of 3 μm, however seldom above 5 μm, interference between the different zones can be effectively eliminated with such a step height.

Such a zoned lens according to the invention can be configured, for example, such that a central circular zone is provided and around it are adjoining concentric annular zones, wherein the surface areas of all the zones is the same. Such a zoned lens can satisfy the otherwise contradicting requirements of having a wide distribution of the effective power and a high intensity of light allowed to pass through, as described in more detail with reference to the drawings. In order to eliminate scattered light from the lateral step surfaces between the zones, in this embodiment of the invention it is advantageously provided that the lateral surfaces of the steps between the zones are provided with a light absorbing material.

The optical path length of a light ray from an object point through the lens to a conjugated image point belonging to this object point is composed of the two values outside the lens and the value within the lens. With the precautions described above, the optical path lengths of light rays through two adjacent zones differ by at least the coherence length. If—as in the case of multifocal lenses—there are several image points conjugated to one object point, the optical path lengths through adjacent zones have to measured between the object point and always the same image point. Any of the available conjugated image points, which may be real or virtual, can be used for this purpose.

The determination of a conjugated image point belonging to a specific object point is known prior art. Examples of methods for implementing this are, however, briefly described again in the description of the drawings.

Further advantages and details of the invention will be described in the following with reference to the attached drawings.

BRIEF DESCRIPTION OF THE DRAWINGS

These show, in

DESCRIPTION OF THE PREFERRED EMBODIMENTS

Figure 1:
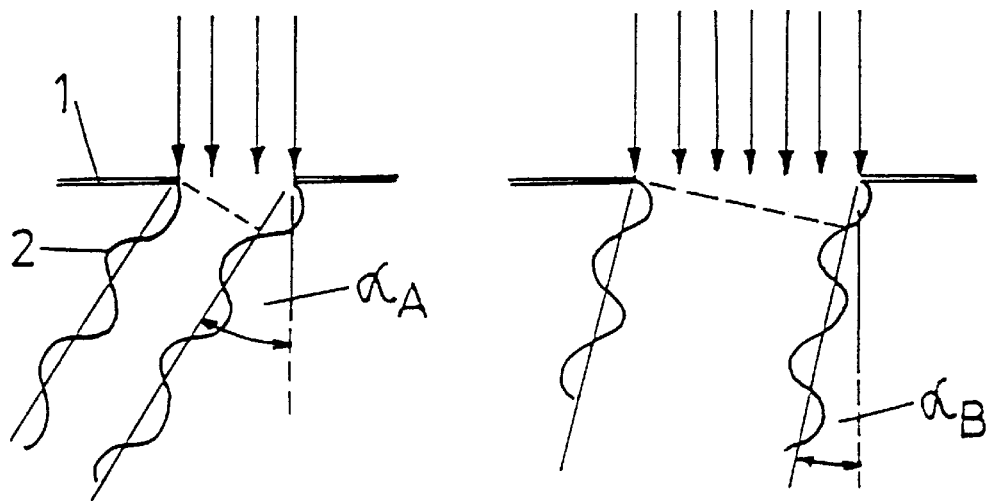
FIGS. 1a and 1b, schematic representations of the ray angle of radiating surfaces, FIG. 2 a distribution of the effective power of a lens, FIG. 3 the dependency of the half-value width of the distribution of the effective power upon the lens aperture, FIG. 4 the dependency of the half-value width of the effective power, normalised to the wavelength of the light, upon the lens surface, FIG. 5 distributions of effective powers with different lens apertures, FIG. 6 a comparison of the interference pattern of a circular surface with an annular surface with the same surface area, FIG. 7 reflectance spectra of difference items, FIG. 8a an embodiment of the invention, FIG. 8b a second embodiment of the invention, FIG. 9 a third embodiment of the invention, FIG. 10 a contact lens according to the invention, FIG. 11 an auxiliary drawing showing the construction of a lens, FIG. 12 the distribution of the effective powers of a lens according to the invention compared to a conventional lens with a surface ten times smaller, FIGS. 13a and 13b, distributions of the effective powers of bifocal lenses without and with interference between the zones, FIG. 14 a distribution of the effective powers of a lens made from birefringent material, FIG. 15 a further embodiment of the invention, FIG. 16 a comparison of the effective power of a conventional lens with that of a system composed of a conventional lens and a lens according to the invention, FIGS. 17 to 20, further embodiments of the invention, FIG. 21 a comparison of the effective powers of different refractive bifocal zoned lenses, both conventional and according to the invention, FIG. 22 the dependency of the optical path lengths upon the distance apart of the light rays from the centre point of the lens for the image point for a power of −5 dioptres, FIG. 23 a further embodiment of the invention, FIG. 24 the dependency of the optical path length differences upon the distance of the rays from the central point of the lens in the case of a conventional refractive bifocal zoned lens, FIG. 25 the dependency of the optical path length upon the distance of the rays from the central point of the lens of a bifocal zoned lens according to the invention at an effective power of 3.75 dioptres.

It is known that the ray width of the light from a radiating surface is greater the smaller the radiating surface. This physical fact can be explained by examination of interference: FIG. 1a shows in a schematic manner a small surface 1, which emits, for example, coherent light 2, wherein all the partial waves transmitted may have identical phases at the location of the emission. The ray width $\alpha_A$ at which the initially destructive interference between the marginal rays or waves occurs, is greater than the width $\alpha_B$ with the same conditions as in FIG. 1b. It can be directly concluded from this that, for example, a lens with a smaller aperture has a greater depth of field than a lens with a larger aperture.

A practical application of this fact is represented by so-called stenopaic spectacles: According, for example, to Graefe-Saemisch: Handbuch der gesamten Augenheilkunde [Handbook of General Optical Medicine], Wilhelm Engelmann publications, Leipzig 1910, page 178, stenopaic spectacles are "characterised by those devices wherein a greater focus of the retinal image (comment: optically refractive devices) is not caused by changing the ray path, but instead in that attempts are made to reduce the dimension of the circle of divergence by suitable apertures, that is to say by the limitation of the incident ray cluster. The simplest form of such spectacles is a diaphragm provided with a very small hole".

The disadvantages of such stenopaic spectacles are essentially apparent in the reduction of the light intensity and in the restriction of the field of vision; further, the capacity for resolution and contrast of optical devices generally reduces with increasing depth of field. With different optical applications, the reduction of the contrast and resolution is acceptable, however.

The disadvantage of the narrowed field of vision can be alleviated by bringing the hole closer to the eye, that is to say by configuring the "spectacle" as a contact lens (or as an intra-ocular lens). The disadvantage of the reduced light intensity is occasionally countered by having several adjacent holes (see Graefe-Saemisch, loc.cit). With adjacent holes, however, interference is produced between the light waves from the different holes, which disadvantageously affects the imaging quality.

With the present invention, a radiating surface can be designed so that each individual partial area of this surface emits light practically unaffected by the other partial areas, so that the interference patterns behind the individual partial areas exist independently of one another, and consequently do not interfere with the wave trains coming from different partial areas. In this way, for example, the light intensity of stenopaic spectacles or lenses can be increased substantially without reducing the optical advantages produced by the restriction of the incident light ray clusters to very small apertures. Furthermore, with the present invention, lenses with a relatively large aperture can be manufactured which have the depth of field of lenses with a very small aperture, which however allow substantially greater light intensities to pass through than the corresponding lenses with a small aperture. Further, with the present invention devices can be produced with which conventional lenses with a large aperture can be given the optical characteristics of lenses with small apertures. Such "stenopaic lenses" with a large aperture and light intensity can be used in many ways in optical apparatuses and optical and ophthalmic devices. For example, in this way ophthalmic viewing aids can be manufactured which serve to correct geriatric vision and/or for the correction of astigmatism. Further, it is also possible with the present invention to manufacture bifocal or multifocal zoned lenses in which interference between the individual zones is suppressed. It is also possible to manufacture bifocal or multifocal lenses in which only zones with the same nominal power can interfere. Lastly, it is possible with the present invention to manufacture Fresnel zone plates which have substantially double the light yield of conventional Fresnel zone plates.

Figure 2:
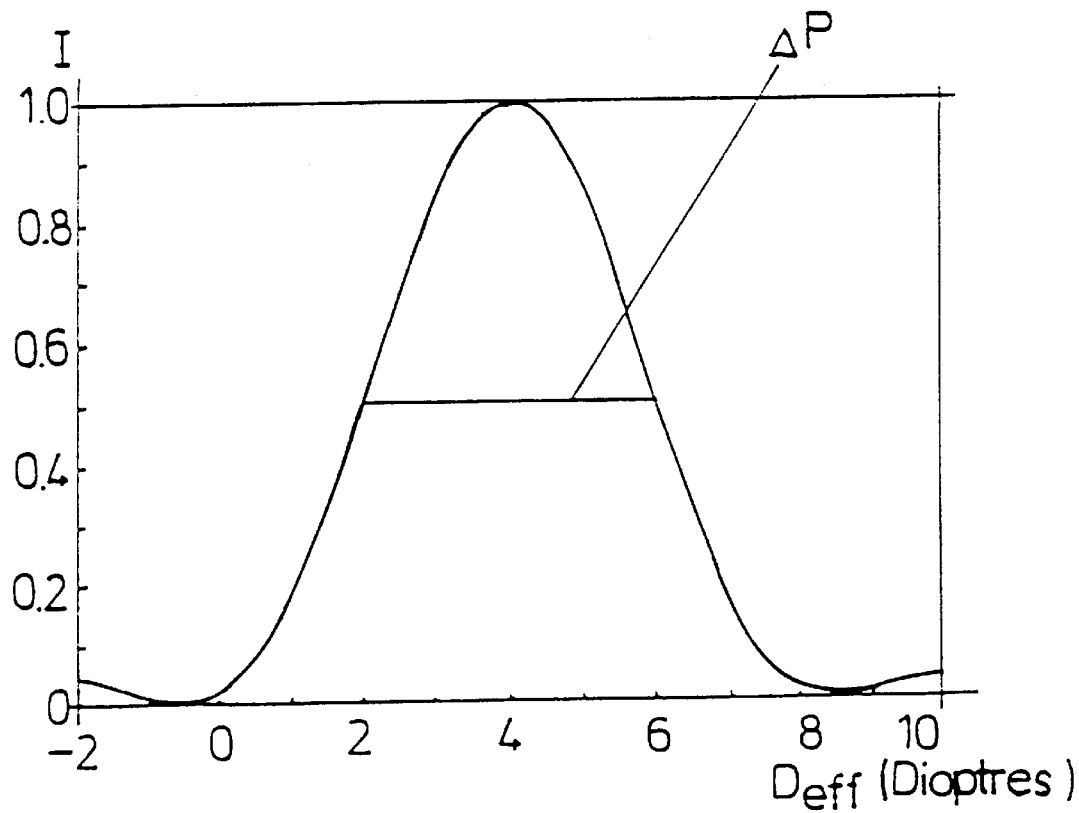

FIG. 2 shows the distribution of the effective power of a lens of 1 mm diameter and nominally 4 dioptres, that is to say the intensity of the light 2 is plotted with respect to the effective power $D_{eff}$. As can be seen, because of this small aperture of 1 mm, this lens provides a wide spectrum of effective power. As a measurement of the width of the distribution of the power, the half-value width $\Delta P$ of the distribution is assumed; for the lens evaluated in FIG. 2, the half-value width (for a light wave length of 560 mm) is approximately 4 dioptres.

The calculation of the distribution of the effective power of a lens—as shown, for example, in FIG. 2—can be done in different ways. Two methods for this are described briefly hereafter:

Method 1:

j connecting rays from an object point O located on the axis of the lens g meters in front of the front surface of the lens are drawn to j points evenly distributed on the front surface of the lens. Then, from each of the j points on the front surface k connecting lines are drawn to k points evenly distributed on the rear surface of the lens. (With numerical evaluation, it makes sense to place the j and k points in an orthogonal grid). Then the k points on the rear surface are connected to an image point B located on the axis of the lens b meters behind the lens (g and b can also have negative values).

Thus there are altogether j*k wave trains which connect the object point O to the image point B. The optical path lengths $L_{jk}$ between O and B are then determined for each of these j*k wave trains. The resulting amplitude in the image point B then produces $$A_{res} = \text{Const.}(\Sigma \sin \phi_{jk} + \Sigma \cos \phi_{jk}); \phi_{jk} = (L_{jk}/\lambda) 2\pi,$$

wherein $\lambda$ is the wavelength of the light. The summation has to be extended to all the j's and k's. The intensity resulting in B is then $A_{res}^2$.

The associated "effective power" $D_{eff}$ is further given by $$D_{eff} = 1/g + 1/b$$

Distribution curves as shown in FIG. 2, are obtained by changing g or b; the two values g and b can also be varied simultaneously.

Method 2:

As in method 1, an object point O is connected to j evenly distributed points on the front surface of the lens. These connecting lines then represent j light rays, for which the law of refraction is used to obtain the j broken light rays within the lens. The broken j light rays meet in j points on the rear surface of the lens; now each of these j points is connected to the point B. In this way j wave trains are obtained between the points O and B and consequently Lj different optical path lengths of the j wave trains. The resulting amplitude in B is then given by $$A'_{res} = \text{Const}^*(\Sigma \sin \phi_j + \Sigma \cos \phi_j) \text{ with } \phi_j = (L_j/\lambda)^* 2\pi$$

The summation now has to be extended to all j wave trains.

The two methods give practically the same result, when summation takes place over sufficient rays and points. As the complexity of the calculation is substantially less with method 2, this method is to be preferred. The characterisation of lenses set out hereafter is also done according to the principles of method 2. To calculate different effective powers $D_{eff}$, the image distance b can further be kept constant and only the object distance g varied, whereby the 1/r-loss of the amplitude does not have to be taken into account explicitly.

According to the formula set out above for the effective power $D_{eff}$, it should be noted that a given object width $g_k$ is connected to the conjugated image width $b_k$ (or a given image width $b_k$ to the conjugated object width $g_k$) approximately as follows.

$$D = 1/g_k + 1/b_k$$

wherein D is the nominal power of the lens. This approximation is relevant for thin lenses, in which the two main planes practically coincide. Further, these conditions are applicable only for lenses in air or in a vacuum. If the conjugated values $g_k$ and $b_k$ are used in the condition for the effective power $D_{eff}$, for thin lenses in a vacuum only, the nominal power is obtained. In other cases the relationship given above ($D_{eff} = 1/g + 1/b$) represents a definition of an "effective" power $D_{eff}$.

If a medium with the refractive index $n_v$ is located in front of the lens, and behind the lens a medium with the refractive index $n_h$, the conjugated object or image widths can be determined with the aid of calculation of the ray path through the lens. With this, the deflections of the rays on the refracting lens surfaces are calculated by means of Snell's law of refraction. In the case of spherically curved lens surfaces, and small lens apertures, the basic relationship $$n_1/a + n_2/b = (n_2 - n_1)/r$$

can be used, wherein $n_1$ is the refractive index in front, and $n_2$ is the refractive index at the rear of the refracting surface with the spherical radius r, and wherein a and b are the distances measured in front of and behind the refracting surface along a normal on the refracting surface. In each case, the conjugated object and image widths can be determined for a light ray emitted from an object point; further, with the aid of considerations set out here—and known—a lens or a lens zone can be designed so that all light rays originating from the object point are broken at the same conjugated image point, see below.

Figure 3:
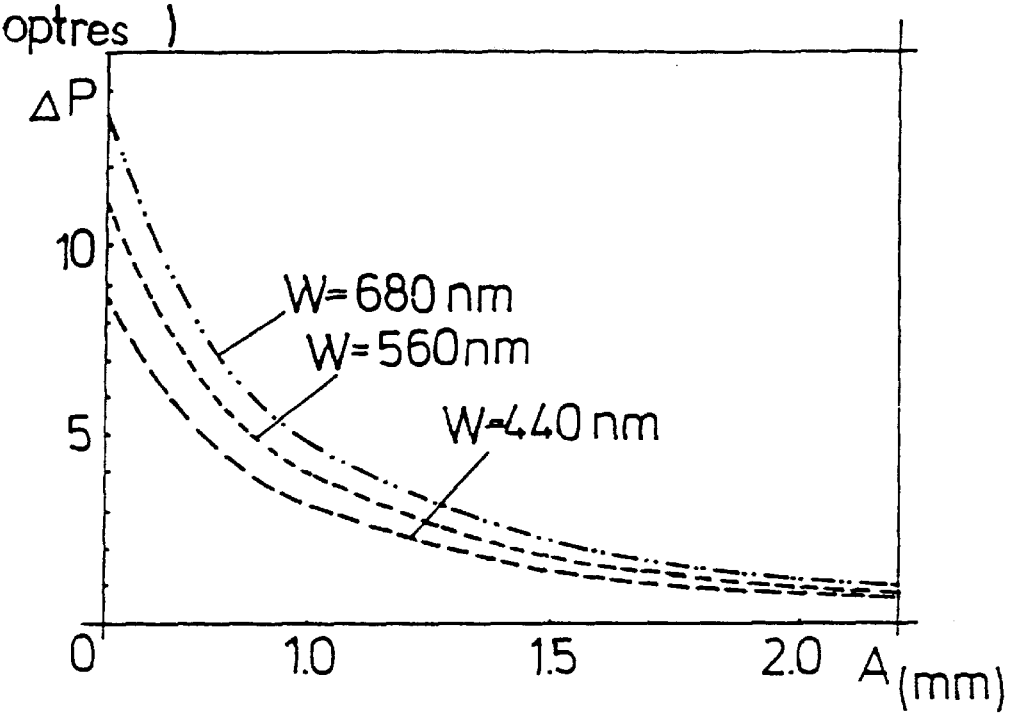

The dependency of $\Delta P$ of the distribution of the effective power upon the lens aperture A (and the wavelength) is represented in FIG. 3. It is noted that this half-value width is independent of the nominal power of the lens.

Figure 4:
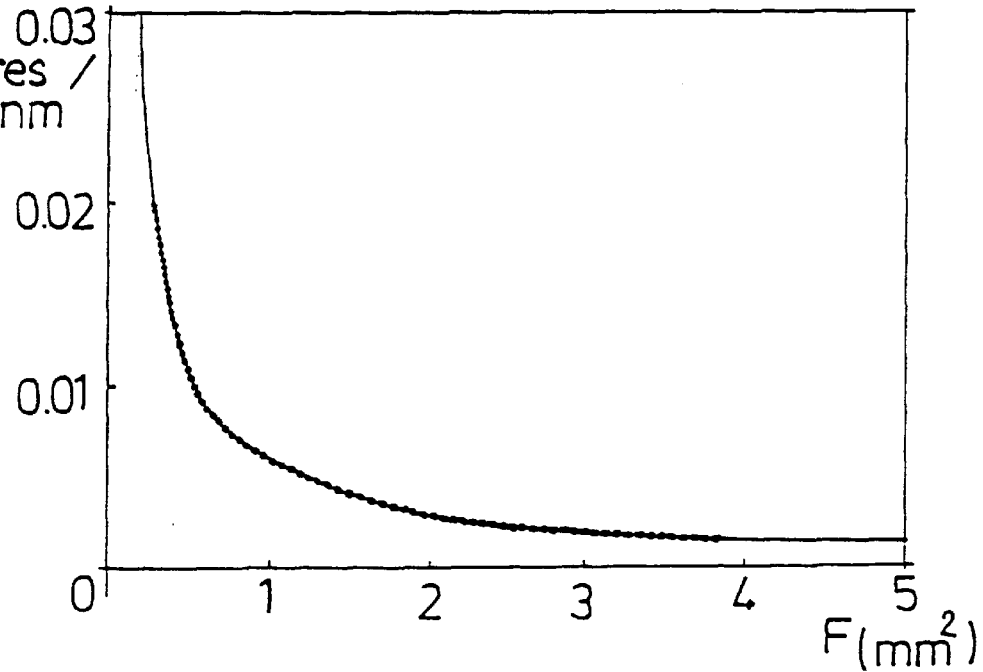

FIG. 4 can be derived from the results of FIG. 3. As can be seen, the half-value width $\Delta P$ of the power distribution can be given as a good approximation of the function $$\Delta P = \lambda^* 0.0056/F$$

shown in FIG. 4 by a broken line, wherein $\Delta P$ is the half-value width in dioptres, $\lambda$ is the wavelength in nm and F is the radiating lens surface in mm$^2$.

Figure 5:
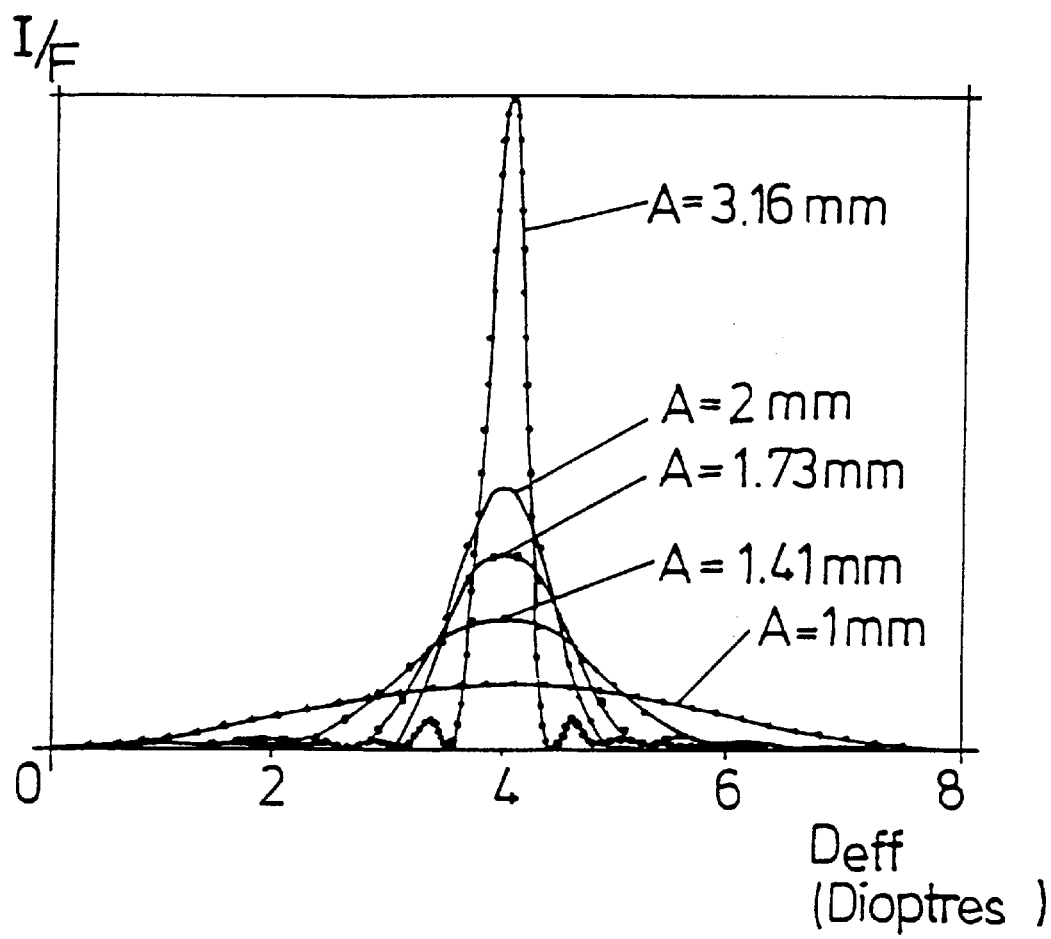

The reduction of the half-value width with an increasing lens surface can be seen from the results in FIG. 5, in which the intensity I of the light normalised on the lens surface F is plotted with respect to this effective power $D_{eff}$ for a lens with a nominal power of four dioptres. The lens with an aperture A of $3.16 = \sqrt{10}$ mm has a surface ten times larger than one with a diameter of 1 mm, the half-value width (and thereby the depth of field) of the larger lens is correspondingly smaller.

Figure 6:
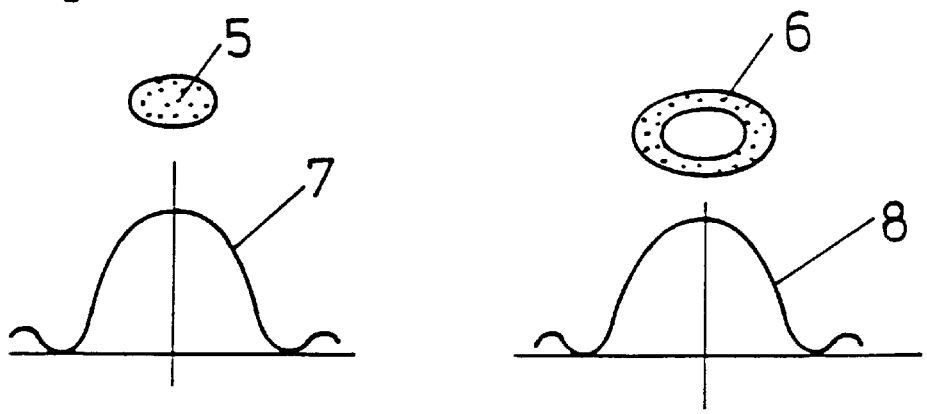

In order to understand the present invention, it is now essential that the interference pattern (7), depicted in FIG. 6 behind a circular radiating surface 5, is the interference pattern (8) behind an annular surface 6 concentric to this circular surface, when the area of the circular surface 5 and of the annular surface 6 is identical; this result can be derived, for example, directly from the theory of the Fresnel zone plate.

To multiply the intensity, the circular surface is surrounded by as many concentric annular surfaces as desired.

In order to obtain the optical properties of radiating surfaces with a small area, with a system using such small surfaces the interference of the waves from the individual small surfaces has to be prevented. The interference of waves from different partial areas of a radiating surface differ by at least the coherence length of the emitted (or re-emitted) light; the optical path lengths are measured from the location of the light emission to the location of the interference or non-interference (image point or potential image point).

As described in standard works (for example, Bergmann-Schäfer, Optik [Optics] pps 331 ff, Max Born, Berlin-Heidelberg, New York 1972, p. 111) two light waves interfere with one another when the difference in their optical path length is smaller than the coherence length $C.L.=\lambda^2/\Delta\lambda$, wherein $\lambda$ is the average wavelength and $\Delta\lambda$ is the half-value width of the wavelength distribution of the spectrum transmitted by the light source. The coherence length of "white light" is approximately 1 $\mu$m (see Bergman-Schäfer, loc.cit p. 333); this value is obtained directly by using $\lambda$=55 nm and $\Delta\lambda$=300 nm (white light comprises a wavelength range of approximately 400 to 700 nm).

Figure 7:
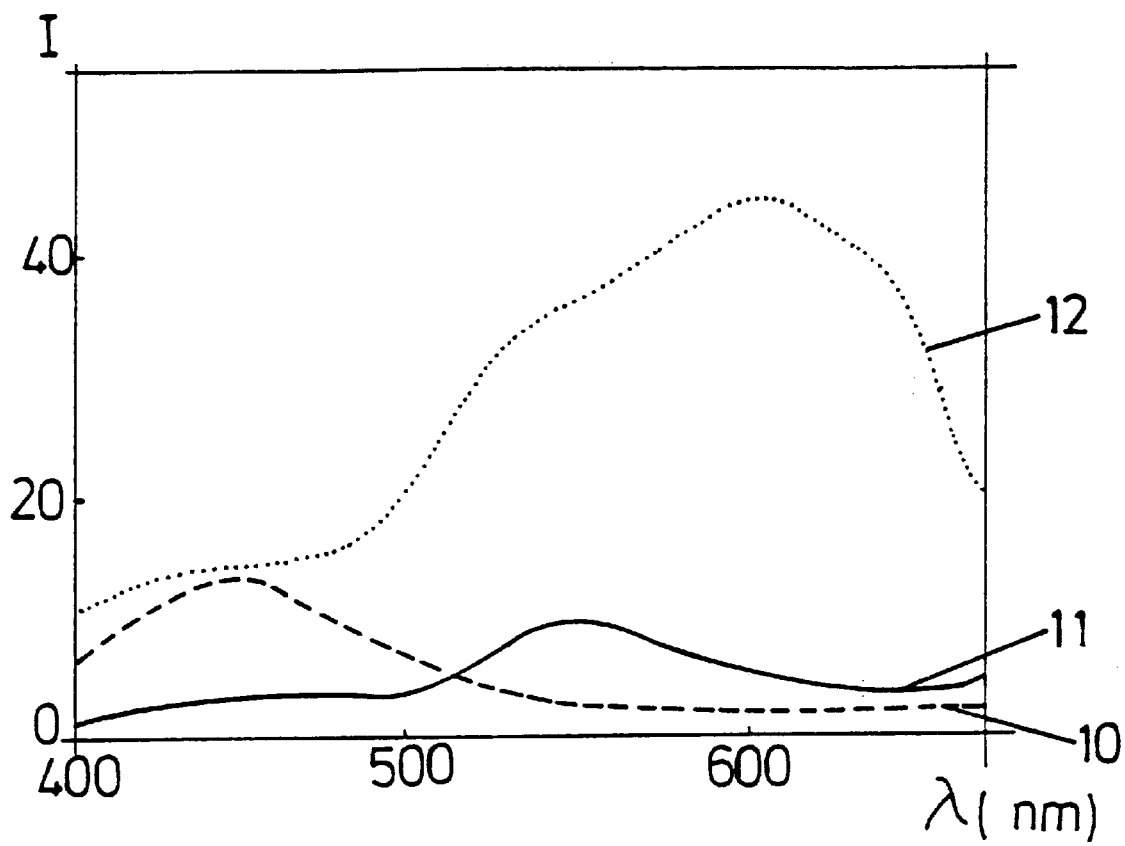

In optical and ophthalmic applications, as a rule light re-emitted from objects is being dealt with. In FIG. 7 the re-emission spectra of blue car paint 10, the leaf in a bunch of roses 11 and of a yellow apple are shown. The coherence lengths of these objects are 2 $\mu$m, 3.6 $\mu$m and 2.3 $\mu$m. From these results it can be concluded that the coherence lengths of the visible light emitted from objects seldom exceeds values of approximately 5–10 $\mu$m (in comparison, laser light which is emitted in an extremely narrow wavelength range has coherence lengths of many meters).

In order, for example, to now configure the individual zones of a lens so that the light waves do not interfere behind the lens because of the different zones, it is sufficient to configure the zones so that the optical path lengths of the light rays associated with the light waves through the different zones have differences of at least the coherence length. Such zoned lenses or optical devices are hereinafter referred to as "coherence length corrected".

Figure 8A:
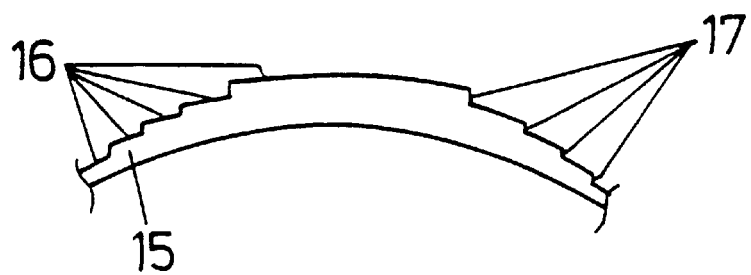

FIG. 8a shows a possible embodiment. The lens 15 is formed such that each of its zones 16 has a nominally equal power (the nominal power is then the power at which the distribution curve for the effective power is maximum; see FIG. 2). The curvature of the front or rear surface of the zones 16 can be calculated according to known lens formulae. Further, the zones 16 can be configured so that the optical path lengths of all the rays through a given zone 16, measured from an object point passing through the zone 16 to the conjugated image point corresponding to the nominal power (in the case of negative lenses or zones 16, the image point is virtual), are exactly equal (the expression "aplanatic" is occasionally used for such lenses or lens zones). The individual zones 16 of the lens are now of different thicknesses, so at the borders between the zones there are steps 17. The height of the individual steps 17 between the zones 16 must now be at least $C.L./(n_1-n_i)$, wherein $n_i$ is the refractive index of the medium adjacent to the lens 15 and $n_1$ is the refractive index of the lens material, so that the differences in the optical path lengths of the waves associated with the rays through the different zones 16 are greater than the coherence length of the light processed. If the axis of the lens represents, for example, the z-axis of a system of coordinates, the height of the steps 17 is the absolute amount of the difference between the largest z-coordinate of the front or rear surface of the one zone 16 and the smallest z-coordinate of the front or rear surface of the zone 16 bordering this zone 16.

The steps can, as already described, naturally be configured either on the front surface or the rear surface of the lens, and embodiments in which both lens surfaces are provided with steps are also possible. In order to avoid scattered light from the lateral surfaces of the steps 17, they can be covered with a light absorbing material. The steps between adjacent zones can also be inclined and/or curved, so adjacent zones are connected not by cylindrical walled surfaces, but instead by conical walls or barrel-shaped walls. Such wall surfaces can themselves be considered as annular lenses with a smaller total surface and very large absolute refractive power. The (slight) amount of the light incident upon the wall surfaces compared to the total amount of light incident upon the lens is then very much broken by these wall surfaces, and occurs as background intensity. In this respect, these areas should not be considered as "zones" of the zoned lens according to the invention, however, but rather as transitional areas between adjacent zones. It can also be of use to cover such wall surfaces with a light absorbing layer.

A lens according to FIG. 8a can, for example be configured as a contact lens. In recent years methods have also been developed for correcting refractive errors in the eye by appropriate ablation of the cornea itself by means of a laser (excimer laser). Because of the degree of precision, in principle, of removal of corneal layers by means of a laser, there is the possibility of making an appropriate coherence length correction directly on the surface of the cornea. The refractive index $n_i$ is then that of the cornea (approximately 1.37).

Figure 8B:
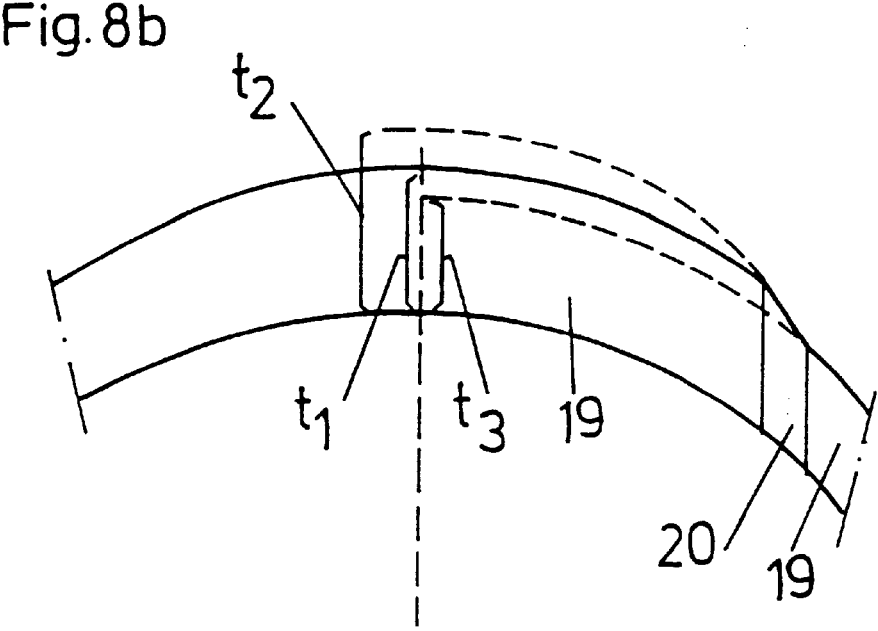

If steps on the front or rear surface of the lens are not desired, the optical path difference desired can also be produced in the individual lens zones by the use of material with different refractive indices. FIG. 8b schematically shows such a lens: zones 19 (only two of these are shown in FIG. 8b) in which a material with a refractive index $n_g$ is used alternate with zones 20, which have a material with a refractive index $n_k$ (only one shown), wherein $n_g > n_k$. For cases where all the zones 19, 20 have the same nominal refractive power, the curvatures of adjacent zones 19, 20 are different. In this way the theoretical central thicknesses $t_1, t_2, t_3, \ldots$ belonging to the individual zones can be constructed. A good approximation of the differences in the optical path lengths for rays through the individual zones (measured for the nominal refractive power) is given by $$\Delta L_{12} = t_1*(n_g-1) - t_2*(n_k-1)$$

wherein $\Delta L_{12}$ is the optical wave length difference between the rays through the zone 1 and through the zone 2.

In an analogue manner $$\Delta L_{13} = t_1*(n_g-1) - t_3*(n_g-1)$$

is obtained.

In general, the difference $\Delta L_{1m}$ in the optical path lengths between a zone 1 and a zone m is given by $$\Delta L_{1m} = t_1*(n_1-1) - t_m*(n_m-1)$$

wherein $t_1$ and $t_m$ are the central thicknesses belonging to zones 1 and m, and $n_1$ and $n_m$ are the refractive indices in zones 1 and m. From this condition it can be inferred that it is possible, by appropriate selection of parameters (refractive indices, lens thickness), to make the difference in the optical path length of rays through any two zones greater than the coherence length of the light used.

Figure 9:
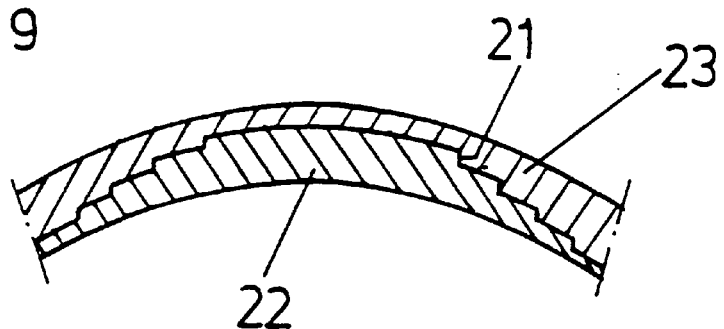

In the case, for example, of contact lenses, a step-shaped surface can lead to a loss of wearing comfort. A correction of coherence length is, however, also possible with lenses having both surfaces smooth, that is to say constant. FIG. 9 shows a possible embodiment. The step heights 21 in this embodiment are now at least $C.L./(n_1-n_2)$ in size, wherein C.L. is the largest coherence length of the light to be dealt with, and $n_1$ and $n_2$ are the refractive indices of the two lens materials 22, 23. The individual lens zones again have the same nominal refractive power.

Figure 10:
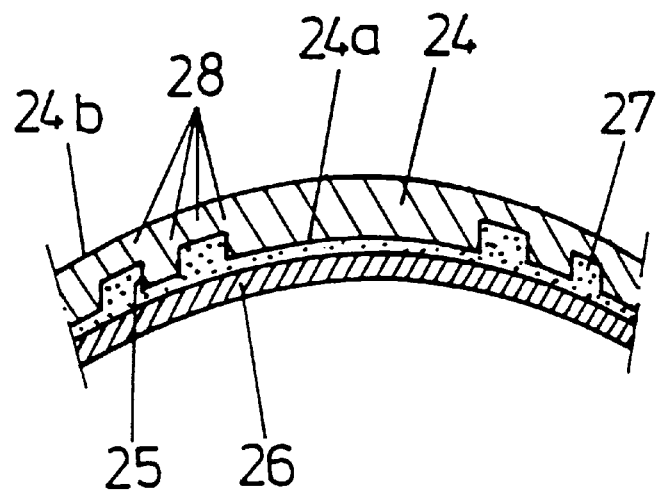
Figure 11:
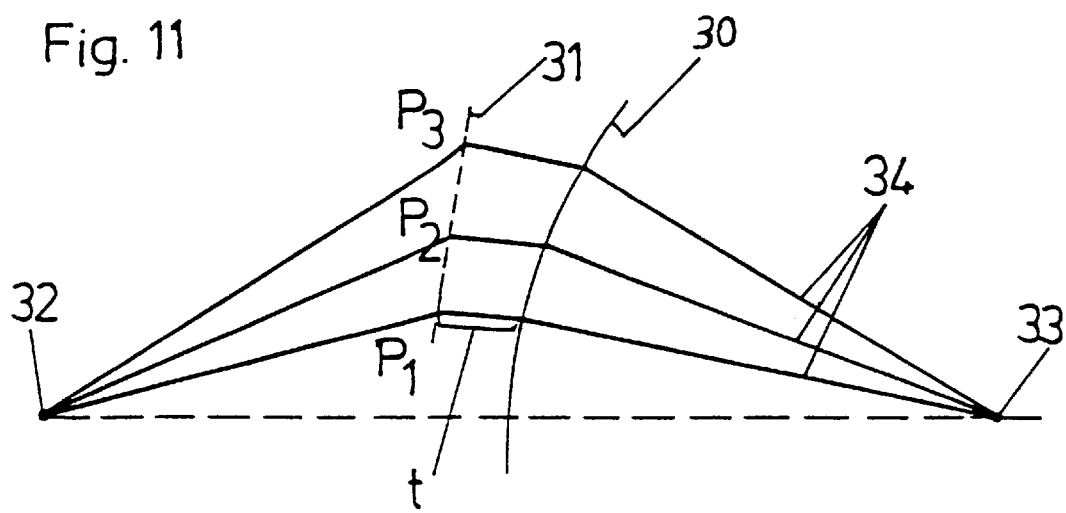

A further possible embodiment, for example of a contact lens 24, is shown in FIG. 10. In this case the steps 25 on the rear surface 24a of the lens 24 are configured so that approximately 50% of the rear surface 24a can be fitted to to the cornea 26, by which means good wearing comfort can be obtained. Half of the zones 28 have indentations which fill with tear fluid 27. It is now possible to configure a front surface 24b differentiable constantly and in sections—that is to say substantially smooth—so that the differences in the optical path lengths of two rays passing through different zones 28 is at least greater than the coherence length of the light concerned. This possibility is based on the following (FIG. 11); when a surface, for example the rear surface 30 of a lens or lens zone is given (the rear surface is rotationally symmetrical but not necessarily spherical), with a given initial thickness t, points P1, P2, P3 . . . on the front surface 31 can be calculated so that lens or lens zone has a uniform refractive power, that is to say is "aplanatic". The connection of all $P_i$'s then represents the front surface 31. The rays 34 are then transmitted from an object point 32 and go to an image point 33. Analogue considerations apply in the case of the front surface previously described, wherein, in the case of the lens according to FIG. 10, the influence of the tear fluid zoned lens has to be taken into consideration.

Figure 12:
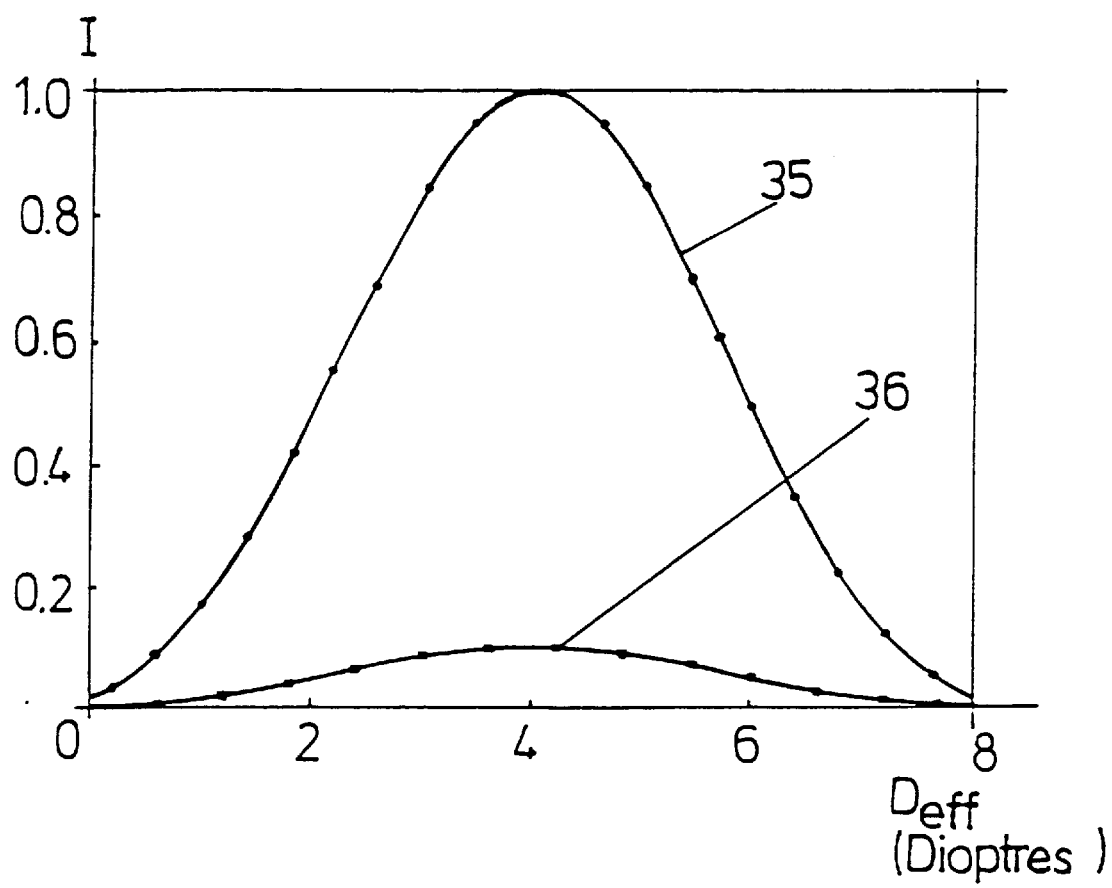

FIG. 12 shows the intensity I of the light dependent upon the effective refractive power $D_{eff}$, wherein in the curve 35 the development of the intensity of a lens divided into 10 coherence length corrected zones with an aperture of 3.16 mm is shown. As can be seen, with 10 times the light capacity allowed through, such a lens has an intensity distribution of the effective power which corresponds to that of a lens ten times smaller with only one zone and one aperture of 1 mm (curve 36). If the zones of the lens are not coherence length corrected, there is, by contrast, a distribution of the effective refractive power according to FIG. 5.

With respect to the intensity accompanying the individual effective powers, it should be noted that the coherence length correction can not lead to an increase in the total light capacity allowed to pass through the lens, that is to say regardless of the zone structure the same light capacity is measured integrally directly behind the lens. The configuration of the zones consequently influences the local distribution of the total light capacity, but not the transmitted light capacity itself.

The requirements for the production of such lenses are somewhat less than for the production of conventional diffraction lenses (see, for example, U.S. Pat. No. 4,340,283, U.S. Pat. No. 4,637,697). This is because while with diffraction lenses the height of the steps must be configured at around precisely 1/10 wavelengths or approximately 50 nm (see, for example, Stanley A. Klein and Zhuo-Yan Ho, "Multizone Bifocal Contact Lens Design" SPIE, Vol. 679, p. 25, August 1986), it is simply necessary with coherence length corrected zoned lenses that the steps do not exceed a certain minimum value (several $\mu$m).

As can be seen, a lens according to FIG. 12 has a half-value width of intensity distribution of approximately 4 dioptres. Such a lens is therefore suitable, for example, for correcting the hyperopia of geriatric vision with a larger requirement for distance addition. Because of the intensity development of this lens, this lens works best for the middle distance. As described already, the half-value width of the intensity distribution is independent of the nominal refractive power of the lenses, with the result that such lenses can be used for emmetropia, hyperopia and myopia.

Figure 13A:
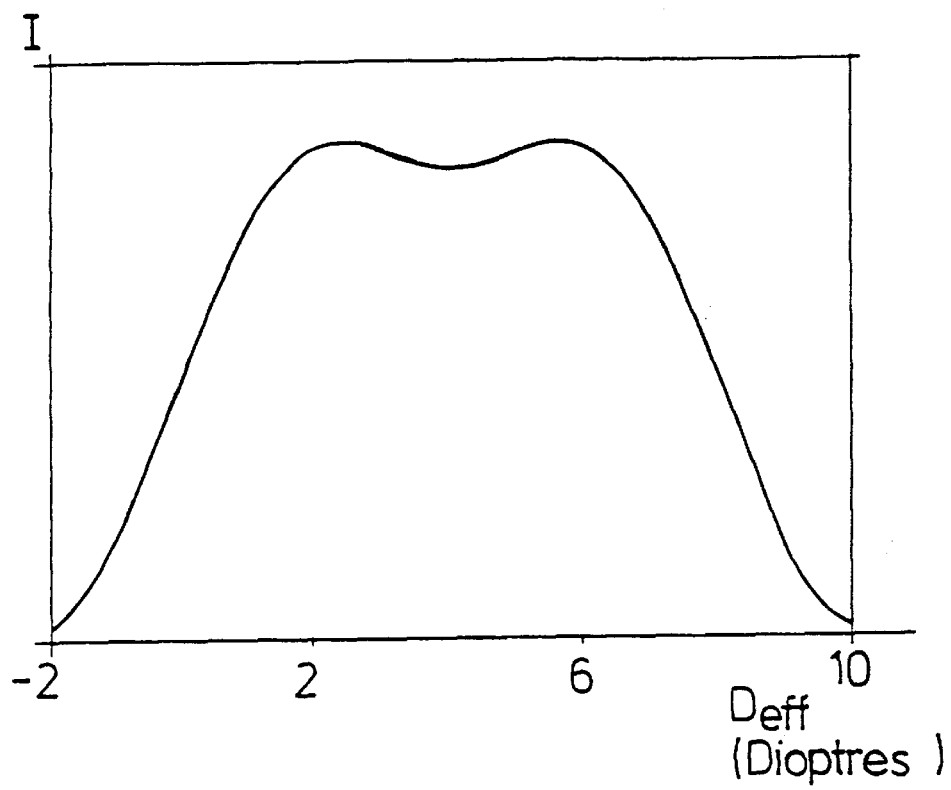
Figure 13B:
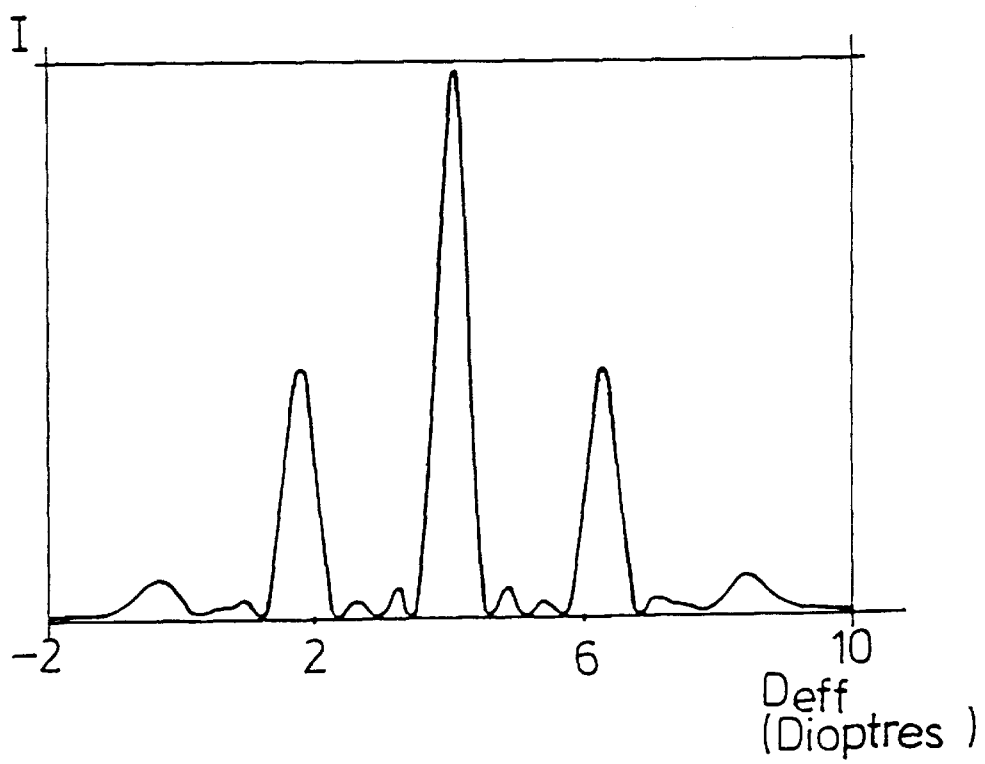

If the preference towards the middle distance with a coherence length corrected lens is not desired, there is the possibility to provide the zones of such a lens with, for example, alternating different nominal powers. FIG. 13a shows the dependency of the intensity I of the light upon the effective power $D_{eff}$ with such a bifocal lens, in which each of the 5 zones (area of each being $\pi/4$ mm$^2$) is provided with a nominal power of 2 or 6 dioptres. A lens of this type provides, for example, an approximately constant intensity of approximately 1 to 7 dioptres. If, in comparison, the zones of this lens are not coherence length corrected, this results in the distribution of the effective power shown in FIG. 13b. Such a lens would therefore be trifocal, wherein the average power depends on the interference of light waves from the different zones. A similar result was obtained by Klein and Ho (SPIE, loc.cit) for a bifocal refractive bi-zone lens. It should be noted that so-called refractive bifocal lenses, for example according to U.S. Pat. No. 5,106,180 and PCT/JP92/01730 do not represent coherence length corrected lenses, in which interference between zones with different powers can be observed.

The zones of a lens with alternating different powers can, as can immediately be seen, be made from material with the identical refractive index or from different materials with different refractive indices. If the zones are provided with different refractive indices, it is possible to make both lens surfaces constant or smooth, as can be inferred from the above description (FIG. 8). If only a single optical material is used for the lens, steps have to be provided between adjacent zones; as the step heights are generally only a few micrometers, it is also possible with stepped lenses to make the stepped surface approximately smooth, that is to say making transitional areas instead of the steps. Such transitional areas are practically inevitable in the production of such lenses, for example by means of turning, as the turning tools do not have an infinitely small radius.

Figure 14:
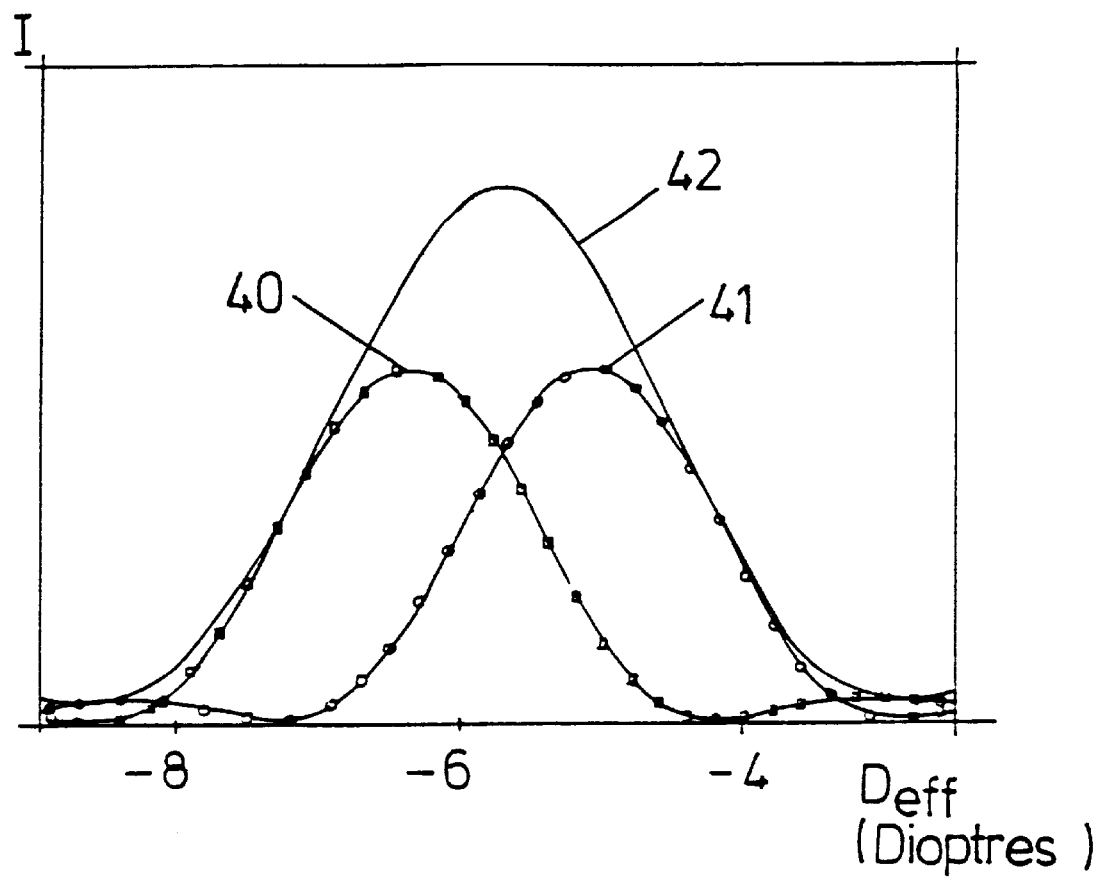

A further possibility for dealing with the distribution of the effective power is in that a coherence length corrected lens is made from birefringent material. FIG. 14 shows the dependency of the intensity I of the light upon the effective power $D_{eff}$ of a lens with a 4.5 mm diameter, which is divided in to 10 zones with the same area, wherein the zones are corrected for coherence length. The lens is made from a birefringent material, the refractive index of which is 1.51 (for ordinary rays) and 1.66 (for extraordinary rays). Curve 40 shows the intensity of the extraordinary rays, curve 41 shows the intensity of the ordinary rays, and curve 42 shows the total intensity. The individual zones do not interfere as they are coherence length corrected, the ordinary and the extraordinary rays do not interfere as in a known manner waves polarised orthogonally with respect to each other do not interfere (see, for example, Max Born, loc.cit, p. 113). Such a lens can, for example be used for the correction of myopia of approximately −7D distance addition in geriatric vision. It is known that by using a polarisation filter in combination with birefringent bifocal lenses one or other of the powers can be suppressed (see, for example, U.S. Pat. No. 5,142,411).

It is known that an astigmatic eye can see in focus in a large distance range, if looking through a hole with a small aperture. The disadvantage of such a vision aid is mainly in the low light intensity passing through the hole. As was described, this light intensity can be significantly increased in that coherence length corrected zoned lenses are used instead of the hole. This zoned "lens" can clearly also be provided with zero nominal power.

If losses in contrast or in the resolution capacity are not desired for such a correction of astigmatism, zones with a larger surface can be used, which are not configured in an annular manner but instead as "ellipse rings". While with annular zones the two radii of the m-th zone adjacent to the zone are expressed by $r_m-1=\text{const.}*\sqrt{(m-1)}$ and $r_m-\text{const.}*\sqrt{m}$, an analogue law of formation for the two axes of the ellipses applies for ellipse-shaped zones. If the main axes of the ellipses are, for example, vertical, the lens is provided in the horizontal direction with a wider distribution of the effective power than in the vertical direction (see, for example, Max Born, loc.cit, p. 161); consequently a corresponding astigmatism can be corrected cylindrically to a few dioptres. A lens with elliptical diffraction zones but without coherence length correction is proposed for correction of astigmatism in U.S. Pat. No. 5,016,977.

Figure 15:
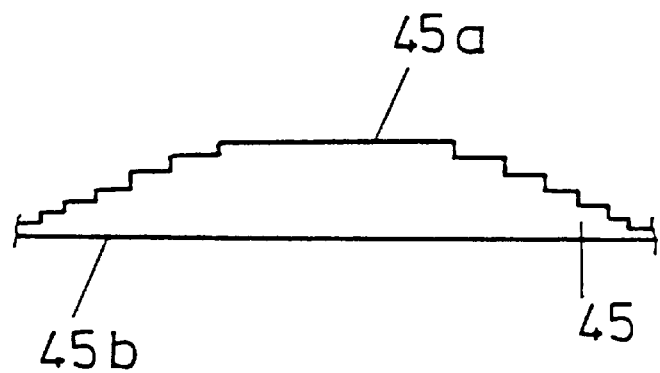

A "zoned lens" 45 with a zero power is shown schematically in FIG. 15. In the example shown the delimitation surfaces (45a, 45b) are planar, whereby this device is designated as a stepped plate. Zones with substantially equal front and rear curvature radii can have an analogue configuration. For simplicity, such a configuration is also designated as a "stepped plate".

It can immediately be inferred from what has been described previously that a further embodiment of such a stepped plate can be in that optical materials which have different refractive indices are used in the individual zones.

Figure 16:
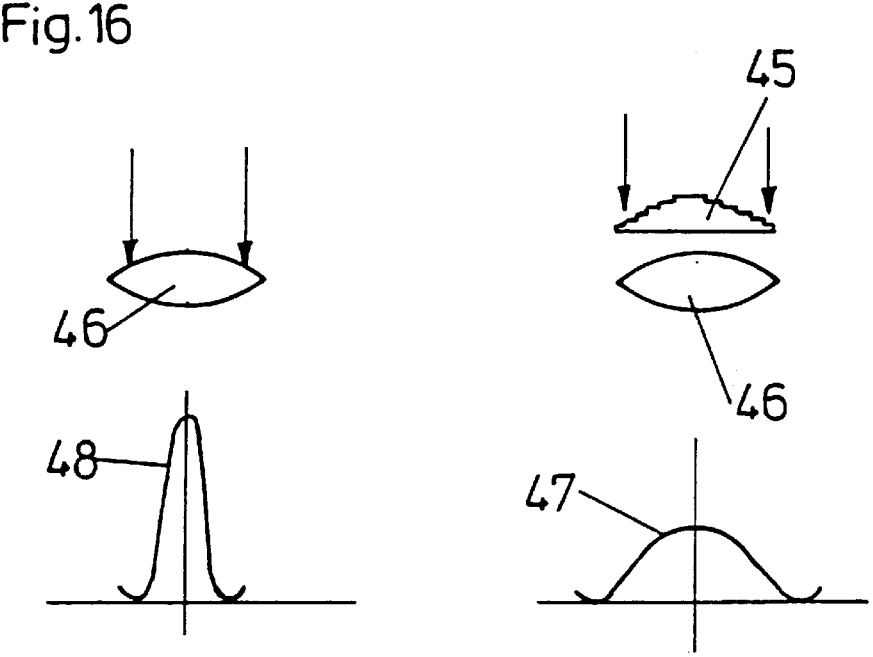

A stepped plate of the type described is mainly used to alter the optical path lengths of the waves or rays passing through the individual zones so that these waves can no longer interfere. When such a stepped plate 45 is used in combination with a conventional lens 46 (see FIG. 16) the optical behaviour of the combination corresponds to that of the coherence length corrected stepped lens described above with only a nominal power. Such a system has a greater half-value width of distribution 47 of the effective power than the corresponding distribution 48 of the conventional lens 46 by itself.

In principle, the possibility arises for fitting a stepped plate in the ray path of optical apparatuses, possibly temporarily, when, for example, the depth of field of the apparatus has to be increased, for example with a microscope in order to find the object more rapidly.

Figure 17:
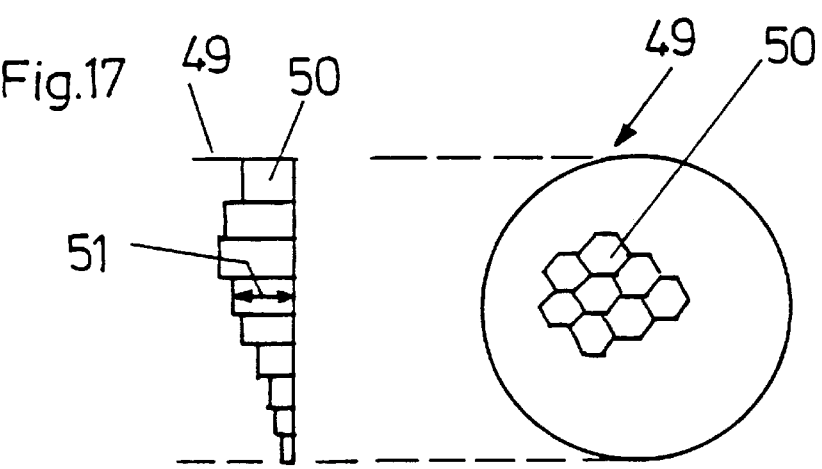

A further embodiment of a stepped plate 49 with zero nominal power is shown schematically in FIG. 17. In this case the individual zones 50 have, for example, a hexagonal cross-section. The zones are configured so that each height 51 of each zone 50 differs by at least $C.L./(n_z-n_u)$ from the height of any other zones 50. In this case C.L. is the coherence length of the light used, $n_z$ is the refractive index of the lens material and $n_u$ is the refractive index of the medium adjacent to the lens. In this way it is again guaranteed that the light waves passing through the different zones 50 do not interfere.

If a stepped plate according to FIG. 17 is used in combination with a conventional lens, a substantially narrower distribution curve for the effective power of such a combination is obtained than with analogue use of a stepped plate according to FIG. 15, when as previously the intensity distribution along the axis of the lens is considered. If, on the other hand, the intensity distribution is considered along the connecting lines between the focal point corresponding to the nominal power and the central point of the zone, when light is incident parallel to the axis of the lens an intensity distribution is again obtained, the half-value width of which corresponds to the surface of the zone (see FIG. 4). In any case, such an arrangement can also contribute, for example, to increasing the depth of field of the lens or of a lens system or optical apparatus.

It is proposed that devices for converting coherent light into incoherent or non-interfering light, which are called stepped plates hereinabove, can have zone cross-sections other than circular, annular or hexagonal.

Figure 18:
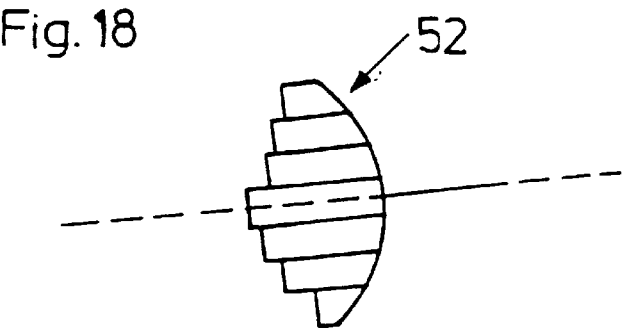

Naturally, it is possible to combine a stepped plate according to FIG. 17 and a refractive lens in one piece; the methods described above are then used in the design of the surfaces of the zones. FIG. 18 schematically shows a lens 52 which has coherence length corrected zones with the same cross-section shape.

In the case of the coherence length corrected zoned lenses described above, with concentric annular zones, it is assumed that the zone surfaces have the same area (Fresnel zone shapes). It is also possible, however, to use zones with an area increasing from the inside to the outside. Then, with an increasing aperture of the lens or of the pupil size, the depth of focus reduces with simultaneous increase in contrast. If the individual zones are configured so that they have alternately two different nominal powers, with an increasing aperture the lens is increasingly bifocal with increasingly clear powers delimited from one another. Theoretically, the reverse behaviour can also be obtained in that the areas of the zones are made smaller from the inside to the outside.

Figure 19:
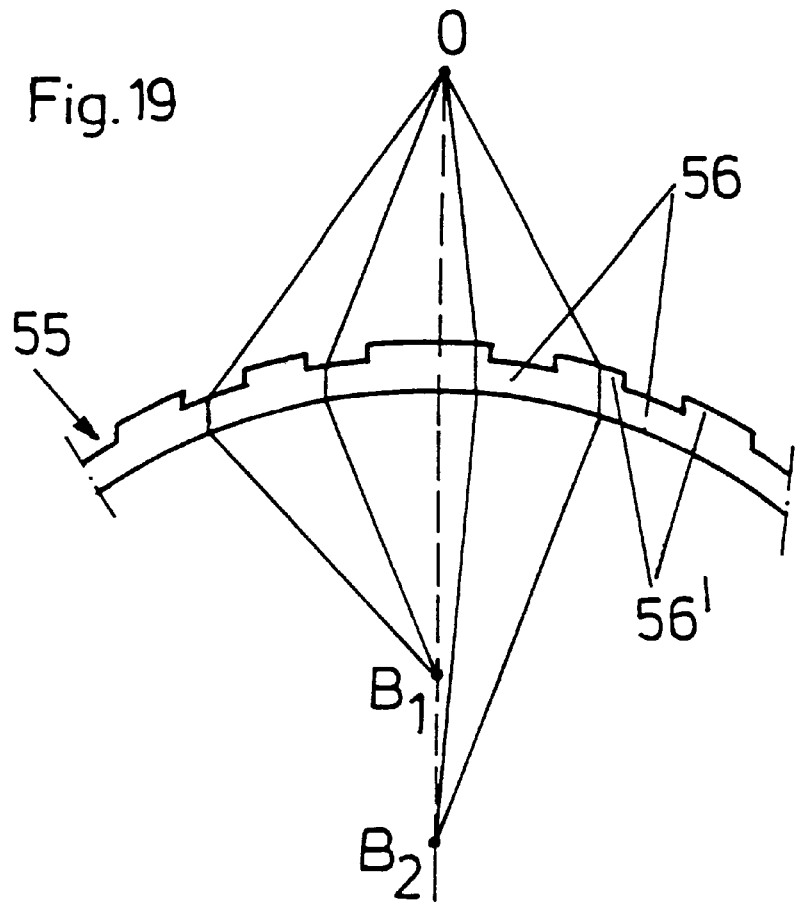

As mentioned, with conventional refractive bifocal zoned lenses there is interference between zones with different nominal powers. If such interference is undesired, there is the possibility to isolate the zones with respect to interference, in that steps are provided between the adjacent zones. FIG. 19 shows a possible embodiment. Such a zoned lens 55 is provided with two types of zones 56, 56', which differ from one another in their nominal power. The lens 55 is also constructed so that the optical wave paths through the zones (56 and 56') with the same nominal power for the rays from the object point to the corresponding conjugated image point ($B_1$ or $B_2$) are all equal. In order to now avoid Fresnel interference if possible, it is appropriate to make the areas of the zones with the same power unequal. Such lenses then represent approximately actual "refractive" bifocal zoned lenses, that is to say the interference between zones with different refractive power is suppressed.

Figure 20:
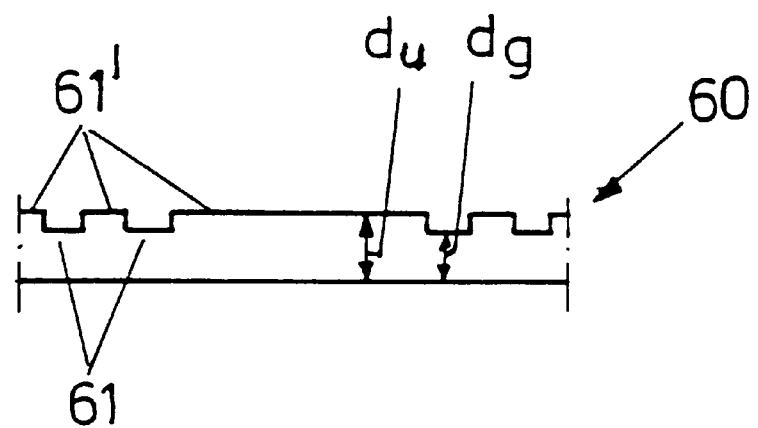

It is known that Fresnel zone plates can be used for focusing electromagnetic waves (in the first order of interference). With conventional Fresnel zone plates the zones are alternately transparent and opaque, which results in a 50% loss in light intensity (in the order of interference concerned). FIG. 20 shows a modification according to the invention of the Fresnel zone plate, in which such a loss of light does not occur. The zones 61, 61' of this zoned lens 60 are configured so that the zones 61, 61' are alternately provided with the thicknesses $d_g$ and $d_u$. The thicknesses are selected so that $(du-dg)*(n1-n2)>C.L.$ applies, wherein C.L. is the coherence length of the electromagnetic ray to be focused, $n_1$ is the refractive index of the lens material, and $n_2$ is the refractive index of the surroundings. The two types of zones (61, 61') then represent mutually independent Fresnel zone plates. The light yield of such a zoned plated 60 is then increased compared to a conventional zoned plate by the factor of 2.

The individual zones of such modified zoned plates can now also be provided with different nominal powers, whereby the zoned plate or zoned lens will be bifocal. In a further development of the concept, such a lens could also be made multifocal. In the case of bifocal zoned lenses of the type described, a principal intensity is directed in the nullified order of interference, and in the ±1., ±2., . . . order further light with strongly decreasing intensity.

It can directly be inferred from what has previously been described, that different optical materials can be used in the individual zones instead of a single optical material. The configuration of the steps of one of the surfaces of the zoned plate can then be omitted. Materials with different refractive indices can also—as is the case with all the lenses described up to this point—be combined with stepped zones.

In summary, it can be said that the zoned plates or zoned lenses made from isotropic optical materials with concentric annular zones can be divided as follows:

Criterion I: Geometrical Proportions of the Zoned Surfaces.
I.1 Fresnel zones: The zones have the same size of area.
I.2 Any area for the individual zones.
Criterion II: Type of Coherence Length Correction:
II.A No correction (=conventional zoned lenses)
II.B Same optical path lengths in zones with the same nominal power
II.C Optical path lengths in different zones differ by at least the coherence length.
Criterion III: Nominal Powers of the Zones
III.a All zones with the same power
III.b Different powers in different zones The alternatives in the three criteria can easily be combined with each other in order to obtain specific optical devices. If in criterion II, option A is selected, conventional lenses are obtained, the options II.B and II.C according to the invention, on the other hand, produce novel lenses. The combination I.1*II.C*III.a represents a lens which corresponds to FIG. 12; conventional refractive zones, for example U.S. Pat. No. 5,106,180, U.S. Pat. No. 4,704,016, U.S. Pat. No. 4,795,462 or PCT/JP92/01730 correspond to the combination I.2*II.A*III.b.

Figure 21:
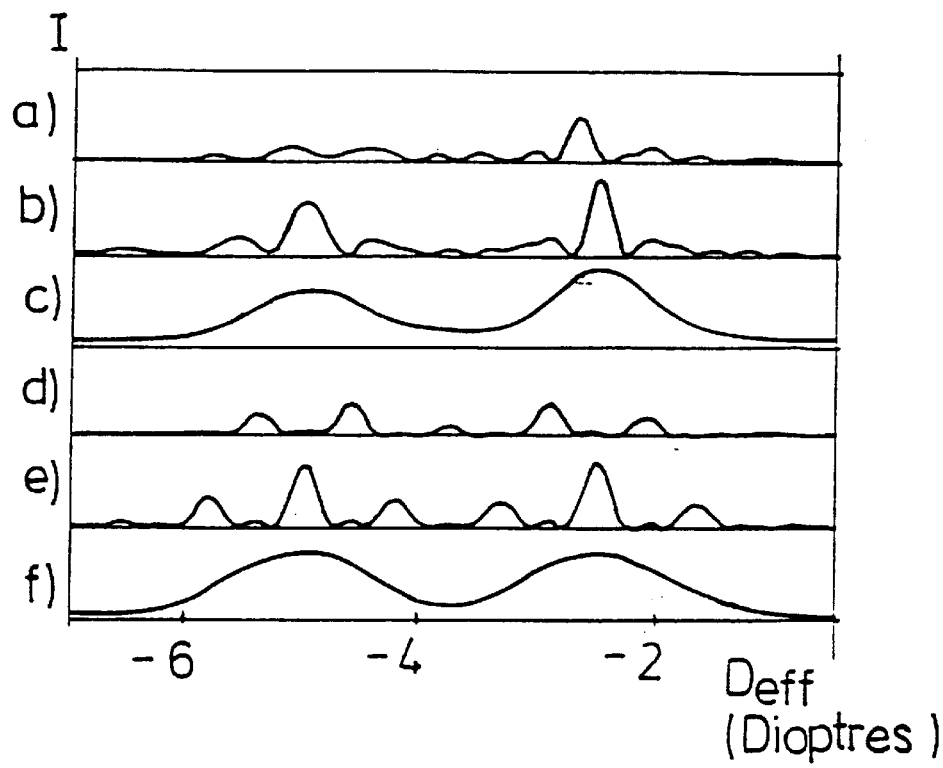
Figure 22:
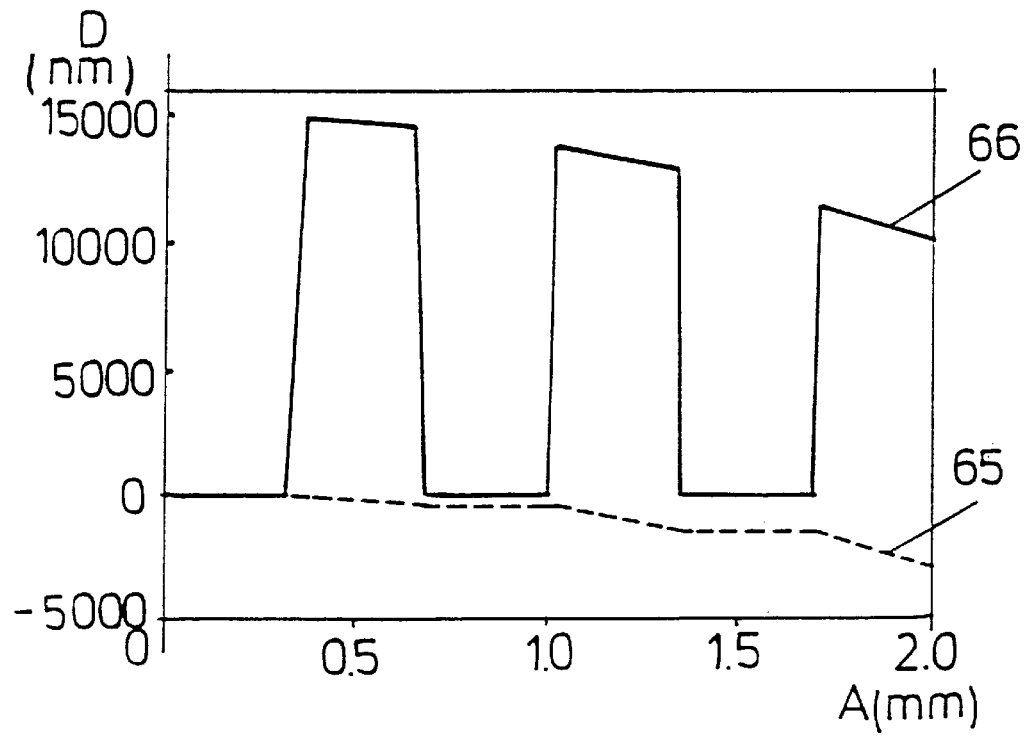

In FIG. 21 the distributions of the effective power of different bifocal lenses is compared. FIG. 21a shows the distribution of a conventional bifocal zoned lens, hereinafter known as lens A, in which all the zones are 0.33 mm wide, FIG. 21b shows the distribution of a bifocal zoned lens according to the invention (lens B) in which interference only occurs between zones with the same power, FIG. 21c shows the corresponding distribution when all the zones are independent (coherence length corrected) (lens C). The corresponding distributions for zones with an equal area in the lens are shown in FIGS. 21d–f, wherein FIG. 21d is again a conventional lens (lens D) with constant transitions between the zones and FIGS. 21e and 21f correspond to lenses according to the invention, wherein in FIG. 21e (lens E) interference occurs only between zones with the same power and in FIG. 21f (lens F) there is no interference between the zones. As can be seen, the conventional refractive zoned lenses (lenses A and D) are the basis for the coherence length corrected embodiments (lenses B, C, E and F). The very wide intensity distributions of lenses C and F can be ascribed to the fact that the zones which are independent of one another have very small surfaces. If more contrast is desired, the number of zones can be reduced or the surface of the zones increased. Of particular note is the absence of the power of −5D in lens A compared to lens B. This can be explained immediately by comparing the optical path lengths (for the image point for the power −5D) of the rays passing through the individual zones (see FIG. 22): the difference in the optical path lengths between all the rays through the lens A (curve 65) is just 2.8 $\mu$m, whereby different—clearly mainly destructive—interference occurs in the image point of the power of −5D. With the coherence length corrected lens B (curve 66) there is exclusively constructive interference of all the rays in the zones with −5D power, the rays from the other zones with −2.5D have optical path lengths greater by at least 10 $\mu$m, and thus do not interfere with the rays from the zones with −5D.

Reference is made expressly to the fact that with all coherence length corrected refractive zoned lenses the constructive interference in the maxima of the effective powers is always in the nullified order; for this reason such lenses have practically no chromatic aberration, as is the case with diffractive bifocal lenses. Reference is also made to the fact that conventional refractive zoned lenses also have a very considerable dependency upon the power distribution of the wavelengths of the light, as there is always wavelength-dependent interference between the individual zones (see FIG. 22).

Figure 23:
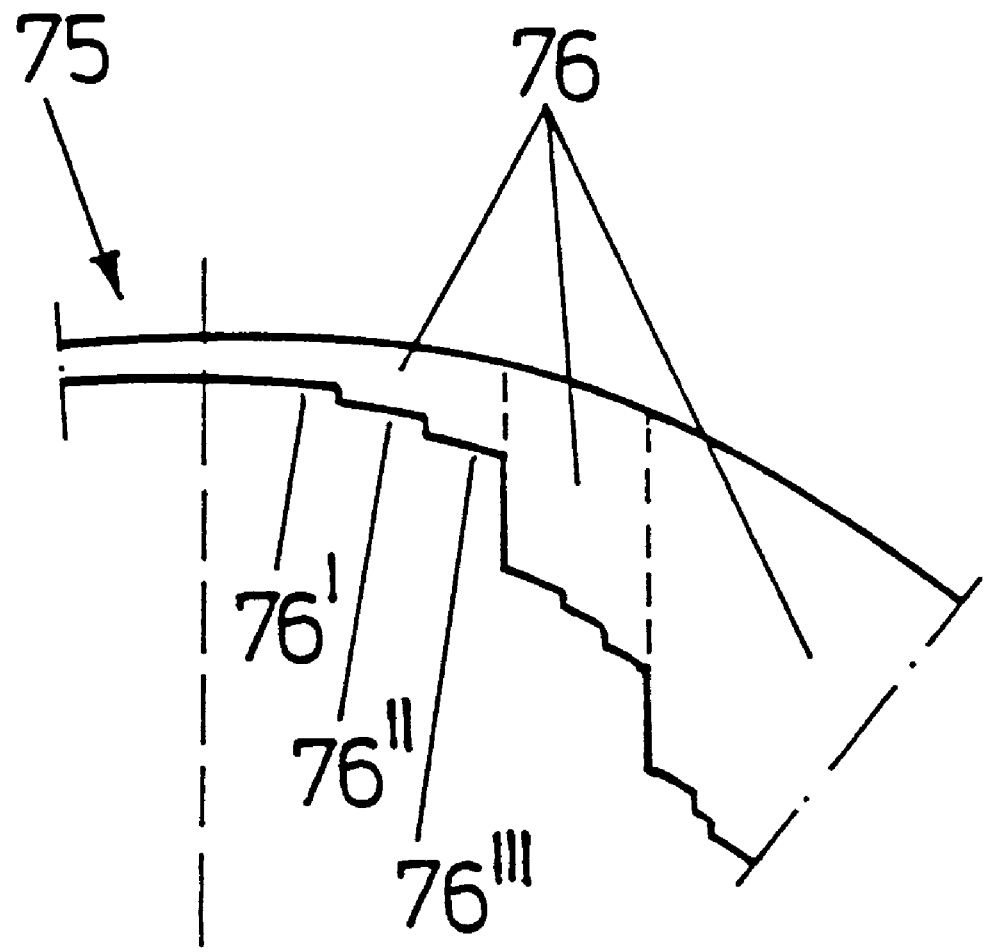

In the previous embodiments it has always been assumed that the nominal powers of the individual zones are refractive powers, that is to say that these powers can be determined using the methods of geometrical optics. The present invention also extends, however, to zoned lenses in which the individual zones coherence length corrected with respect to one another have diffractive powers. FIG. 23 schematically shows such a coherence length corrected diffractive lens 75. As can be seen, the individual zones 76 are provided with diffractive sub-zones (76', 76", 76'''), the differences in the optical path lengths of the light rays through the sub-zones 76', 76", 76''' have fixed relationships in a known manner. Between the optical path lengths of the light rays through the different zones 76 the coherence length correction conditions according to the invention apply, however. Such a coherence length correction is then advantageous when, for example, the depth of field of the two powers of a diffraction lens has to be increased, that is to say when the intensity distribution has to be widened in the two powers. Further, for manufacturing reasons, it is sometimes difficult to implement the required fixed phase conditions between diffractive zones which are far apart; errors in surface configuration of the order of 0.1 micrometer between the zones lying on the inside and outside can result in undesired destructive interference from light from such "untuned" zones. On the other hand, it is easier by comparison to obtain the required degree of precision for adjacent sub-zones 76, 76', 76". The object can therefore be met by having to manufacture just the diffractive sub-zones 76', 76", 76''' with the required precision and to isolate the diffractive zones 76 for interference reasons. With such lenses 76 the sums of the partial intensities of the individual zones is obtained in the powers, and not the vector sums of the amplitudes—reduced in "untuned" zones.

Figure 24:
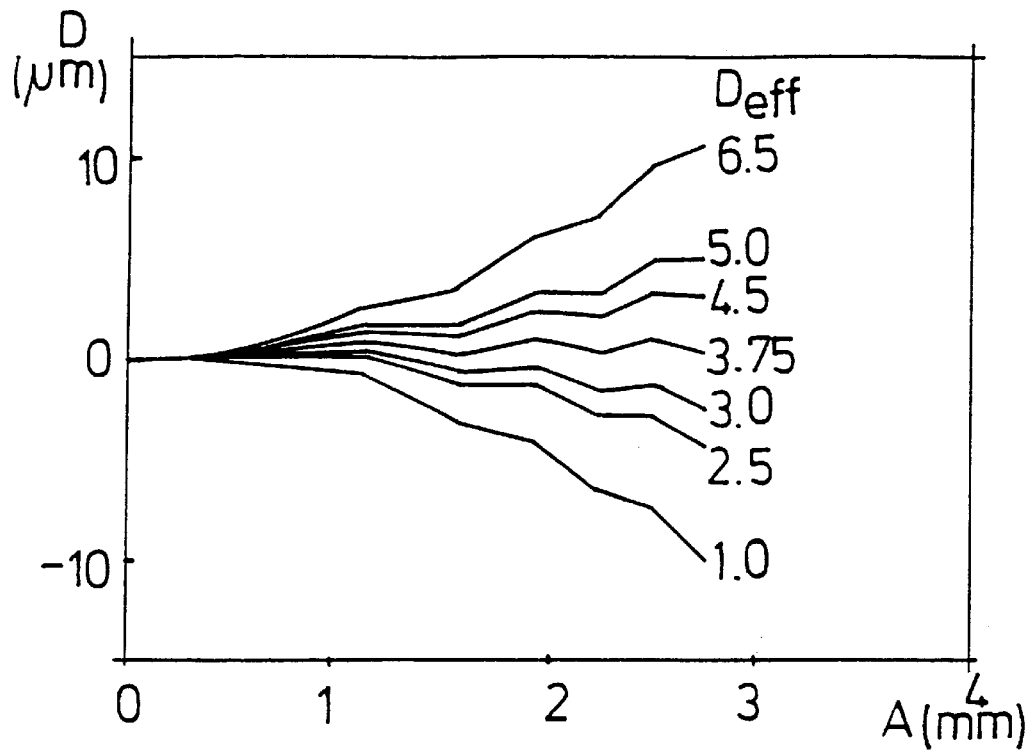
Figure 25:
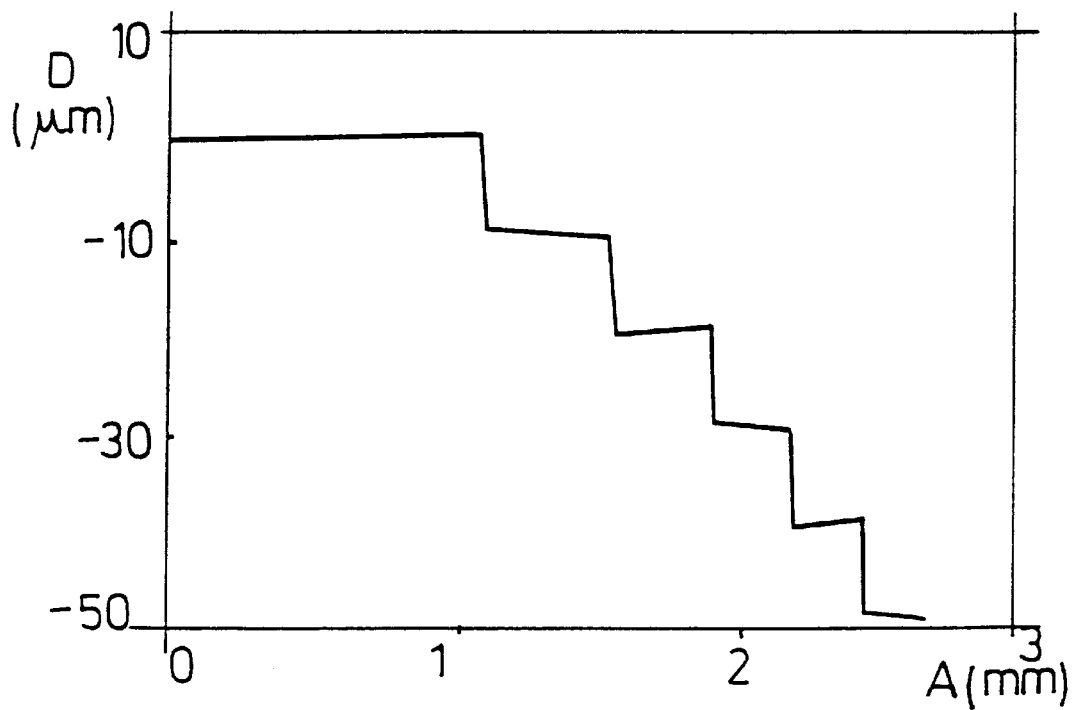

To clarify and to summarise the invention, FIG. 24 shows the optical path length differences D in a conventional refractive bifocal zoned lens (nominal power 2.5 and 5.0 dioptres, which alternate zones have); this lens is thus not coherence length corrected. FIG. 24 shows the path length differences given for rays at different distances A from the centre of the lens for different effective powers $D_{\mathit{eff}}$. As can be seen, all the rays through a certain zone, when the nominal power of this zone corresponds to the effective power, have the same optical path length, wherein the path lengths or average values of these path lengths through different zones are different. For an effective power which represents the average value of the two nominal powers (for example, 3.75 dioptres), the average value of the path lengths of the rays through all zones is the same. This explains the occurrence of an intensity maximum observed between the two nominal powers (see FIG. 13b). For comparison, FIG. 25 shows the result for an embodiment of a coherence length corrected refractive zoned lens with the same nominal powers at the effective power of 3.75 dioptres. With this lens between the individual zones there are, for example, steps which cause the difference in the optical path lengths between two rays passing through different zones in the immediate surroundings of the common zone delimitation to be approximately 10 micrometers. As can be seen in FIG. 25, with coherence lengths of under approximately 10 micrometers no interference of light waves from the different zones can occur, which means that for this effective power there is a summation of the scalar intensity from the individual zones (see FIG. 13a). Naturally the differences in the optical path lengths of rays passing through two adjacent zones are, also for other effective powers in the case of the lenses presently described, about 10 micrometers, however for characterising the relationships, the conditions for the effective power which corresponds to the average value of two adjacent zones with different (or the same) nominal power is suitable.

The present embodiments deal with the conditions for electromagnetic rays in the visible range. Naturally, analogous considerations can also be used for devices for dealing with wave-shaped rays of other types and/or other wave length ranges.

The considerations described in the previous embodiments with respect to the coherence length correction of zoned lenses can naturally also apply to the behaviour of mirrors and zoned mirrors for visible electromagnetic radiation, or also for electromagnetic radiation with other wave length ranges. The imaging equations of lenses can be transferred simply to the imaging conditions of mirrors, see for example Bergmann-Schäfer, Lehrbuch der Experimentalphysik, Vol. 3, Optik [Manual of Experimental Physics, Vol. 3, Optics] Berlin, New York 1993, page 88. Through this it is easily possible for the man skilled in the art to use the above-described considerations and conditions for the conditions of imaging mirrors or mirror systems. For this reason imaging mirror systems in which a coherence length correction is carried out, are also devices according to the invention, even though they are not discussed in full.

As an example, it is known that a parabolic mirror focuses electromagnetic radiation incident parallel to the axis of the mirror at the focal point. It may now be desired that a mirror focuses the incident radiation in different focal points. This can be achieved when the mirror is composed from different zones with different focal lengths. If such zoned mirrors are configured so that their surface is constant, disturbing interference (for example destructive interference) of radiation from the individual zones of the mirror can occur in the individual focal points. If, on the other hand, the zones of a multifocal mirror are configured so that steps are located between adjacent zones, and so that the waves arriving from individual zones at the focal point have differences in their path lengths of at least the coherence length of the incident radiation, such possibly disturbing instances of interference are suppressed.

If radiation is used which for which certain materials are transparent, that is to say that a refractive index can be given for such materials, mirror zones—analogous to the considerations set out above—can also be covered with materials with different refractive indices in order to obtain an appropriate coherence length correction.

I claim:

1. Zoned lens with several zones, comprising a central circular zone and several circular ring zones concentrically arranged around said central circular zone, wherein at least two adjacent zones are configured such that two light rays which pass through these two adjacent zones have optical path lengths between an object point and an image point which are different by at least a coherence length of the light used, which is at least 1 $\mu$m, and wherein further for obtaining a distribution of the effective power with a half-value width $\Delta P$ of at least one dioptre the surface area measured in mm$^2$ of each zone has a maximum value of $0.0056\lambda$, wherein $\lambda$ is a wavelength of the light used measured in nanometer.

2. Zoned lens according to claim 1, wherein any two light rays which pass through these adjacent zones have optical path lengths between the object point and each of the associated image points which are different by at least the coherence length of the light used.

3. Zoned lens according to claim 1, wherein the optical path length differences of all light rays which pass through two different zones of the lens are at least equal to the coherence length of the light used.

4. Zoned lens according to claim 1, wherein when there is parallel incidence of the light, the differences in the optical path lengths between a plane perpendicular to the direction of incidence and an associated focal point of light rays which pass through two adjacent zones of the lens are at least equal to the coherence length of the light used.

5. Zoned lens according to claim 1, wherein the light rays parallel to the axis pass through optical path lengths inside the lens in two adjacent zones, the differences of which are at least three times the coherence length of the light used.

6. Zoned lens according to claim 1, wherein adjacent zones of the lens have a different thickness of lens material, and wherein steps are provided between the zones.

7. Zoned lens according to claim 1, wherein the step height between adjacent zones of the lens is at least $|\lambda^2/(\Delta\lambda (n_c-n_i))|$, wherein $\lambda$ is the average wavelength of the light used, $\Delta\lambda$ is the half-value width of the wavelength distribution of the light used, $n_c$ is the refractive index of the lens material, and $n_i$ is the refractive index of the medium adjacent to the lens.

8. Zoned lens according to claim 6, wherein when visible light is used with a coherence length in the region of approximately 1–10 $\mu$m, the step height, measured in micrometers, between adjacent zones of the lens is at least $5/|(n_c-n_i)|$, wherein $n_c$ is the refractive index of the lens material, and $n_i$ is the refractive index of the medium adjacent to the lens.

9. Zoned lens according to claim 6, wherein the step height between adjacent zones of the lens is at least three micrometers.

10. Zoned lens according to claim 6, wherein the lateral surfaces of steps between the zones are arranged to be light-absorbent.

11. Zoned lens according to claim 1, wherein adjacent zones of the lens have materials with different refractive indices.

12. Zoned lens according to claim 1, wherein the lens has at least two layers of different materials, wherein at least one interface between adjacent zones of the lens located between two such layers has steps.

13. Zoned lens according to claim 12, wherein adjacent zones of the lens have a different thickness of lens material, and wherein steps are provided between the zones, and further wherein the step height, measured in micrometers, between adjacent zones of the lens is at least $5/|(n_1-n_2)|$, when light is used with a coherence length in the range of approximately 1–10 $\mu$m, wherein $n_1$ and $n_2$ are the refractive indices of the materials of the two layers.

14. Zoned lens according to claim 1, wherein the areas of the zones are of substantially equal sizes.

15. Zoned lens according to claim 1, wherein the refractive nominal power of the individual zones is equal.

16. Zoned lens according to claim 1, wherein at least two types of zones are provided, wherein all the zones of one type have the same nominal power, and zones of different types have different nominal powers.

17. Zoned lens according to claim 16, wherein zones of different types are directly adjacent.

18. Zoned lens according to claim 17, wherein for one type of zones the optical path lengths of all light rays from the object point through one of the zones of this type to a conjugated image point belonging to this type are equal.

19. Zoned lens according to claim 16, wherein the differences in the optical path lengths of two light rays passing through different types of zones of the lens from an object point to an image point are at least equal to the coherence length of the light used.

20. Zoned lens according to claim 1, wherein the optical medium of the lens is a birefringent optical material.

21. Zoned lens according to claim 1, wherein at least a part of the zones have diffractive sub-zones, wherein these zones have diffractive powers.

22. Zoned lens according to claim 1, wherein for obtaining a distribution of the effective power with a half-value width $\Delta P$ of at least two dioptres the surface area measured in $mm^2$ of each zone has a maximum value of 0.0028. $\lambda$, wherein $\lambda$ is a wavelength of the light used measured in nanometers.

23. Zoned lens according to claim 1, wherein for obtaining a distribution of the effective power with a half-value width $\Delta P$ of at least four dioptres the surface area measured in $mm^2$ of each zone has a maximum value of 0.0014. $\lambda$, wherein $\lambda$ is a wavelength of the light used measured in nanometers.

24. Zoned lens according to claim 1, wherein the light used is visible light.

25. Zoned lens according to claim 1, wherein the light used is infrared light.

26. Zoned lens according to claim 1, wherein the light used is ultraviolet light.

27. Zoned lens according to claim 1, wherein the lens is an ophthalmic lens.

28. Zoned lens according to claim 1, wherein the lens is an optical instrument for correction of astigmatism regardless of the axis, in particular of irregular astigmatism.

29. Zoned lens according to claim 1, wherein the lens is an intracorneal lens.

30. Zoned lens according to claim 1, wherein the lens is a contact lens.

31. Zoned lens according to claim 1, wherein the lens is a spectacle lens or part thereof.

32. Zoned lens according to claim 1, wherein the lens is an intraocular lens.

33. Zoned lens according to claim 1, wherein the lens is an optical system, preferably a telescope or microscope.

34. Zoned mirror, which includes at least two adjacent zones which are configured so that the differences in the path lengths between an object point and an image point of radiation which is incident upon these two zones are at least equal to the coherence length of the radiation used.

35. Zoned mirror according to claim 34, wherein for parallel incidence of radiation, differences in the path lengths of rays which are reflected from different zones, which differences occur between a plane perpendicular to the direction of incidence and a focal point, are at least equal to the coherence length of the radiation used.

36. Zoned mirror according to claim 34, wherein for obtaining a distribution of the effective power with a half-value width $\Delta P$ of at least one dioptre the surface area measured in $mm^2$ of each zone has a value of maximal 0.0056. $\lambda$, wherein $\lambda$ is a wavelength of the radiation used measured in nanometers.

37. Zoned mirror according to claim 34, wherein the coherence length of the light used is at least 1 $\mu$m.

38. Zoned mirror according to claim 34, wherein the light used is visible light or infrared light or ultraviolet light.

39. A zoned lens comprising at least two types of zones, wherein all zones of one type have the same nominal power, and zones of different types having different nominal powers and are direction adjacent, wherein at least two adjacent zones are configured such that two light rays which pass through these two adjacent zones have optical path lengths between an object point and an image point which are different by at least a coherence length of the light used, which is at least 1 $\mu$m, and wherein for one type of zone the optical path lengths of all light rays from the object point through one of the zones of this type to a conjugated image point belonging to this type are equal.

* * * * *